(12) United States Patent
Silverman

(10) Patent No.: US 10,542,739 B1
(45) Date of Patent: Jan. 28, 2020

(54) BACK STRAIN ALLEVIATING AND RAIL FISHING ASSISTING FISHING ROD HARNESS WITH ROTATABLY ENGAGING POLE RECEPTACLES AND ROD SLIDING CHANNEL

(71) Applicant: Mark S. Silverman, Lake Hpoatcong, NJ (US)

(72) Inventor: Mark S. Silverman, Lake Hpoatcong, NJ (US)

( * ) Notice: Subject to any disclaimer, the term of this patent is extended or adjusted under 35 U.S.C. 154(b) by 0 days.

(21) Appl. No.: 16/279,138

(22) Filed: Feb. 19, 2019

(51) Int. Cl.
  *A01K 97/10* (2006.01)
  *A45F 5/00* (2006.01)
  *F16M 13/04* (2006.01)
  *A47C 1/14* (2006.01)

(52) U.S. Cl.
  CPC ............... *A01K 97/10* (2013.01); *A45F 5/00* (2013.01); *A47C 1/146* (2013.01); *F16M 13/04* (2013.01); *A45F 2005/002* (2013.01)

(58) Field of Classification Search
  CPC . A01K 97/10; Y10S 224/922; Y10S 224/907; A45F 5/00; A45F 2005/002; A47C 1/146; F16M 13/04
  See application file for complete search history.

(56) References Cited

U.S. PATENT DOCUMENTS

| 1,296,619 | A | 3/1919 | Bulat |
|---|---|---|---|
| 1,720,982 | A | 3/1925 | Van Brunt |
| 2,060,751 | A | 11/1936 | Baxter |
| 2,139,188 | A | 12/1938 | Haislip |
| 2,271,136 | A | 1/1942 | Geiger |
| 2,298,694 | A | 10/1942 | Haislip |
| 2,480,764 | A | 8/1949 | Pennington |
| 2,742,210 | A | 4/1956 | Bortz et al. |
| 2,990,089 | A | 6/1961 | Nystrom |
| 2,995,855 | A | 8/1961 | Bell |
| 3,009,612 | A | 11/1961 | Fischett |
| 3,035,747 | A | 5/1962 | Ullrich, Jr. |
| 3,114,486 | A | 12/1963 | Flaxman |
| 3,115,997 | A | 12/1963 | Hengst |
| 3,152,738 | A | 10/1964 | Worsford, Jr. |
| 3,774,825 | A | 11/1973 | Schone et al. |
| 3,782,613 | A | 1/1974 | Davis |
| 4,081,115 | A | 3/1978 | White et al. |
| 4,498,257 | A | 2/1985 | Jekel |
| 4,802,612 | A | 2/1989 | Andersen |
| 4,817,323 | A | 4/1989 | Braid |

(Continued)

*Primary Examiner* — Corey N Skurdal
(74) *Attorney, Agent, or Firm* — Stetina Brunda Garred & Brucker

(57) ABSTRACT

An apparatus wearable on a torso of a user to support a fishing rod has a primary panel defining an upper partially spherical socket and a lower partially spherical socket receptive to a partially spherical joint member coupled to a fishing rod in a rotating engagement. A partially spherical joint member slides in a partially cylindrical groove extending from the upper partially spherical socket to the lower partially spherical socket partially spherical joint member. A harness member secures the primary panel to the torso and redirects horizontal forces against the primary panel to a vertical direction. With a butt seat attached to the primary panel, user gains leverage during rail fishing by applying a pulling weight force on the primary panel and the rod while seated thereon.

20 Claims, 5 Drawing Sheets

(56) References Cited

U.S. PATENT DOCUMENTS

| | | | |
|---|---|---|---|
| 4,828,152 A | 5/1989 | Pepping |
| 4,858,364 A | 8/1989 | Butts |
| 5,016,797 A | 5/1991 | Rowledge |
| D318,954 S | 8/1991 | Parkhurst |
| 5,088,634 A | 2/1992 | MacLaren |
| 5,212,901 A | 5/1993 | Bishop et al. |
| 5,551,614 A | 9/1996 | Ham |
| 5,564,217 A | 10/1996 | Riedell |
| D377,563 S | 1/1997 | McConnell |
| 5,626,270 A | 5/1997 | Tseng |
| 5,662,251 A | 9/1997 | Rossiter |
| 5,664,844 A | 9/1997 | Greene |
| 5,738,257 A | 4/1998 | McConnell |
| 5,813,162 A | 9/1998 | Tse et al. |
| 5,855,086 A | 1/1999 | Pandeles |
| 5,957,091 A | 9/1999 | McDonale et al. |
| 6,185,856 B1 | 2/2001 | Yakabe |
| 6,209,253 B1 | 4/2001 | Saldana, Jr. |
| 6,237,821 B1 | 5/2001 | Owen |
| 6,267,276 B1 | 7/2001 | Cook |
| 6,412,602 B1 | 7/2002 | Sundman |
| 6,435,614 B1 | 8/2002 | Gollahon |
| 6,557,292 B1 | 5/2003 | Howard |
| 6,591,540 B1 | 7/2003 | Chargois |
| 6,591,542 B1 | 7/2003 | Jordan |
| 6,764,231 B1 | 7/2004 | Shubert |
| 6,869,146 B2 | 3/2005 | Gollahon |
| 6,893,098 B2 | 5/2005 | Kohani |
| 7,013,596 B1 | 3/2006 | Moore |
| 7,059,503 B2 | 6/2006 | Andersen |
| 7,146,763 B1 | 12/2006 | Stanton |
| 7,671,261 B1 | 3/2010 | Momose |
| 8,181,381 B1 | 5/2012 | Kelleher |
| 8,690,035 B2 | 4/2014 | Silverman |
| 9,066,507 B2 | 6/2015 | Silverman |
| 10,039,275 B2 * | 8/2018 | Grillo ................... A01K 97/10 |
| 2004/0211799 A1 | 10/2004 | Loughman |

* cited by examiner

BACK STRAIN ALLEVIATING AND RAIL FISHING ASSISTING FISHING ROD HARNESS WITH ROTATABLY ENGAGING POLE RECEPTACLES AND ROD SLIDING CHANNEL

CROSS-REFERENCE TO RELATED APPLICATIONS

Not applicable.

STATEMENT RE: FEDERALLY SPONSORED RESEARCH/DEVELOPMENT

Not applicable.

BACKGROUND

1. Technical Field

The present disclosure relates generally to carrying harnesses and fishing accessories, and, more particularly, to a back strain alleviating and rail fishing assisting wearable fishing rod harness.

2. Related Art

Fishing is an activity that has been pursued for generations, primarily for food, though recently for recreational purposes. A wide variety of practices fall under the general category of fishing, including angling, spear-fishing, blast fishing, and so forth. The most popular type of recreational fishing is angling, in which a hook (also referred to as "angle") or other like tackle is attached to an extended, semi-rigid rod by a line. A reel that stores, retrieves, and pays out the line is attached to the base portion of the rod for manipulation by the angler. The hook is dressed with bait or lures to persuade the fish to bite down upon the same, resulting in the capture of the fish. The hook and the bait/lures are cast out to a location in the water where the angler anticipates the fish are congregating using a variety of physically demanding techniques (overhead, underhand, sideways, or variations thereof, depending upon the restrictions imposed by the location and surroundings). Once a bite is detected, the hook is set and the fish is manually reeled back to the angler, also referred to as landing the fish.

This step typically places a greater physical demand on the angler, as it involves repeated bending and straightening of the angler's arms and back. Once hooked, fish have a tendency to resist and fight back against the line being retrieved or pulled back toward the angler. Although conventional fishing lines have substantial tensile strength to withstand such resistance, even for the smallest and weakest of fish, best angling practices still involve a technique by which the tension is distributed to the rod. Specifically, the angler stops spooling the reel while the rod is at a slight angle to surface of the water. Then, the rod is pivoted rearward into an upright position, which pulls the fish closer without decreasing the length of the line. Immediately, the rod is pivoted forward again into the slightly angled position. Typically, at this point, there is a slight slack in the line allowing it to be spooled without much tension. Once further resistance is felt from fish while spooling the reel, the process is repeated. If too much resistance is encountered, the line is released to prevent breakage.

When fishing from a mobile platform such as a boat, the movement of the rod can be restricted to simply forward and backward, as the platform can be rotated left to right to accommodate the movement of the fish. Thus, the rod is maintained in a co-axial relationship to the direction of travel of the fish. However, when fishing from a stationary platform such as a shoreline, the lateral position and angle of the rod relative to the angler must be modified to maintain this co-axial relationship. As such, a sideways pivoting of the rod is also incorporated into the angler's movement.

For stronger anglers, these techniques may be adequate because a substantial exertion of the back and abdominal muscles may not be necessary to pivot the rod rearward. However, such a strength advantage may be marginal, particularly with larger and stronger fish or when fishing in unstable platforms such as the aforementioned boat. Pain caused by the over-exertion of muscles, as well as compression and twisting of the spine, is therefore a common affliction amongst anglers. In the worst case, back and spinal injury may result. These effects are exacerbated for those anglers who are advanced in age and/or of weaker strength.

Relatively recently, a new angling technique known as rail fishing has gained popularity. Rail fishing involves casting the rod on a rail and reeling in a hooked fish in that position by leveraging the rail. Anglers may rail fish from mobile platforms such as boats, where they may rest their rods on boat rails or rod mounts, as well as from stationary platforms such as piers and utilize deck rails. The evolution of rail fishing and longer rail rods used in rail fishing revolves around the principles of potential energy. The potential energy becomes stored within the longer rod and is available as the rod is loaded or bent. Once the rod is compressed or bent, that stored energy causes pressure that can be felt on both the angler and the fish until the rod unloads the energy and returns to its natural state. The rod acts as a lever and the rail that the rod rests on acts as a fulcrum. The more leverage that exists against the fish, which is separated by the rail or fulcrum, the more pressure the angler can apply on the fish with less pressure felt on the angler. Thus, in order to use this energy effectively, anglers must place their rods against the rail and use it as a fulcrum. Anglers use the rail by leaning on the butt of their rods in the squatting or kneeling position, and then springing up and turning the reel handle slowly before repeating the process, thereby putting tremendous pressure on the fish. Maximizing pressure on the fish is crucial in slowing down large fish such as tuna and grouper.

While rail fishing is effective in catching large fish, in executing the technique, anglers face having to squat down or kneel to lean on the rod butt for a considerable amount of time and fight the fish on the hook pulling on the other end. Countering the forces exerted by the fish pulling on the rod on the other side of the rod is a strenuous task and renders rail fishing a tough technique to execute for those who are not seasoned fishermen or lack strength and stamina.

Thus, although pursued with the intention of being a relaxing experience, fishing may paradoxically end up being quite unpleasant. Accordingly, there is a need in the art for an improved back strain alleviating and rail fishing assisting fishing pole harness.

BRIEF SUMMARY

The present disclosure is directed to an apparatus wearable on a torso of a user to support an article, such as a fishing rod. There may be a primary panel that is defined by an external side, an internal side, and a central section. The internal side may have a contour substantially conforming to an abdominal side of the torso. The central section may be interposed between a left peripheral section and a right peripheral section, and further defined by a top and bottom, through which a center axis extends. The primary panel may integrally define an upper partially spherical socket having an open end and a lower partially spherical socket having an open end both aligned the center axis. The primary panel may further define an open partially cylindrical groove extending from the open end of the upper socket to the open end of the lower socket. The upper and lower sockets may be receptive to a corresponding partially spherical joint member in rotating engagement. The joint member may be coupled with the fishing rod and further may be engageable with the groove. There may also be at least one harness member that cooperates with the primary panel to secure the primary panel to the torso and redirect horizontal forces against the primary panel to a vertical direction. Embodiments of the present disclosure will be best understood by reference to the following detailed description when read in conjunction with the accompanying drawings.

DETAILED DESCRIPTION

The detailed description set forth below in connection with the appended drawings is intended as a description of certain embodiments of the present disclosure and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, left and right, first and second and the like are used solely to distinguish one entity from another without necessarily requiring or implying any actual such relationship or order between such entities.

Figure 1:
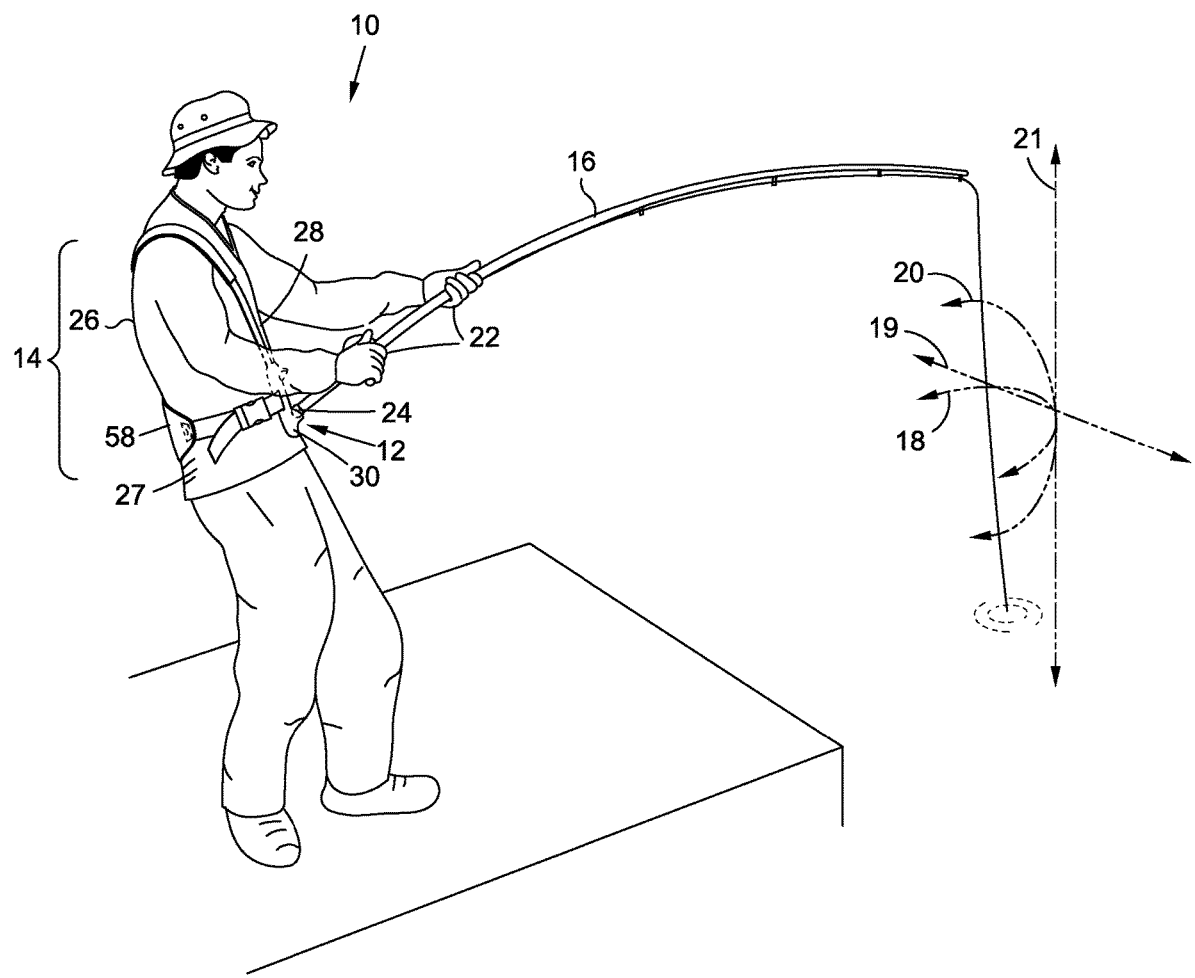
FIG. 1 is a perspective view of an angler fishing with the fishing rod attached to the lower socket of the fishing rod harness.

With reference to FIG. 1, there is depicted an exemplary user/angler 10 fitted with one embodiment of a fishing rod harness 12 that is wearable on the torso 14 of the angler 10. The details of the fishing rod harness 12 will be discussed in the context of fishing, and the fishing-specific term may be utilized interchangeably with the more general term. For example, the fishing rod harness 12 may also be referred to as a fishing rod harness, and the user 10 may be referred to as an angler. Further, such an embodiment is configured to support a fishing rod 16. It will be appreciated that these context-specific terms are for exemplary purposes only and not intended to be limiting. It is expressly contemplated that the apparatus 12 may be used for supporting other articles besides the fishing rod 16, so all disclosed features, regardless of the use of fishing-related terms to describe the same, are understood to be applicable as analogues in other contexts.

According to various embodiments, such as in FIG. 1, the fishing rod harness 12 is understood to alleviate back strain for anglers 10 fishing while standing up by generally redirecting the pressures imparted on the back from the movement of the fishing rod 16 to a vertical orientation or direction 21. A fighting fish is understood to exert forces along the x-axis 18 (side-to-side) as well as the y-axis 20 (up-down) with the pivot point either being the point of contact between a hand 22 of the angler 10 and the fishing rod 16, or a rod butt 24 thereof. Without the presently contemplated fishing rod harness 12, these forces are exerted upon the back 26 of the angler 10 in a horizontal or lateral direction 19, causing the back to bend and twist.

Figure 2:
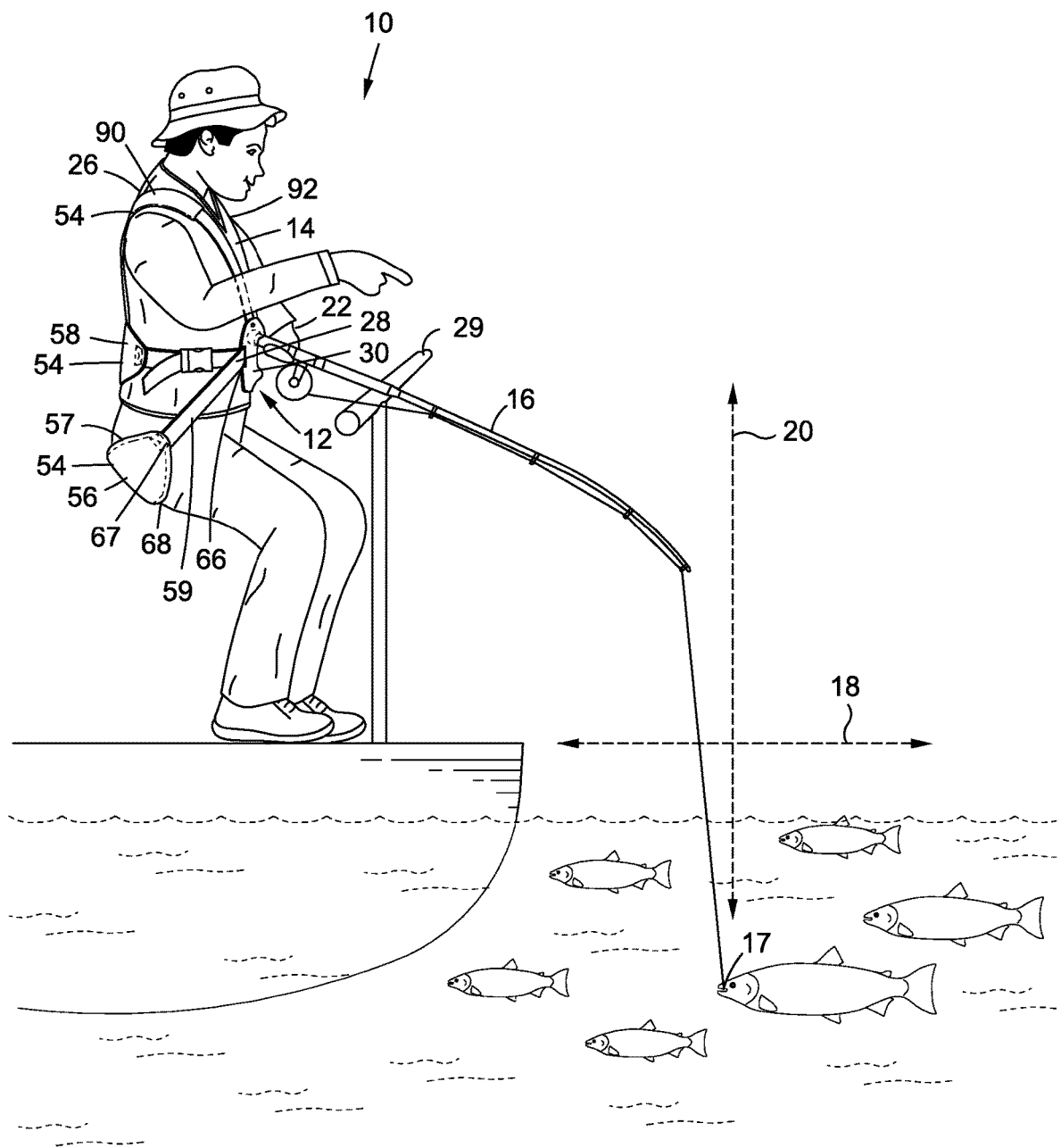
FIG. 2 is a perspective view of an angler rail fishing with the fishing rod attached to the upper socket of the fishing rod harness and leaning on the butt seat.

Additionally, as illustrated in FIG. 2, the fishing rod harness 12 is understood to help the angler 10 gain additional leverage during rail fishing. In rail fishing, the fishing rod 16 rests on a rail 29. The angler 10 squats down to reel in a fish on the hook 17 and adjusts the torso 14 position with respect to the boat rail 29. The angler 10 faces having to squat down or kneel to lean on the rod butt 24 for a considerable amount of time to fight the fish pulling on the other end, which is a tiring and physically demanding task. The fishing rod harness 12 pulls down on the rod butt 24 when the angler 10 leans on the butt seat 56, applying a downward force with body weight. Without the presently contemplated fishing rod harness 12 that utilizes body weight of the angler 10 advantageously, rail fishing would be strenuous and discouraging for inexperienced or physically weaker fisherman.

As shown in FIGS. 1, 2, 3A, and 3B, the fishing rod harness 12 may be worn on the abdomen 28 of the angler 10. The present disclosure employs the term abdomen to refer generally to the frontal portion of the torso 14, though it will be understood that this may also include the chest, thorax, and the pelvis.

Figure 4:
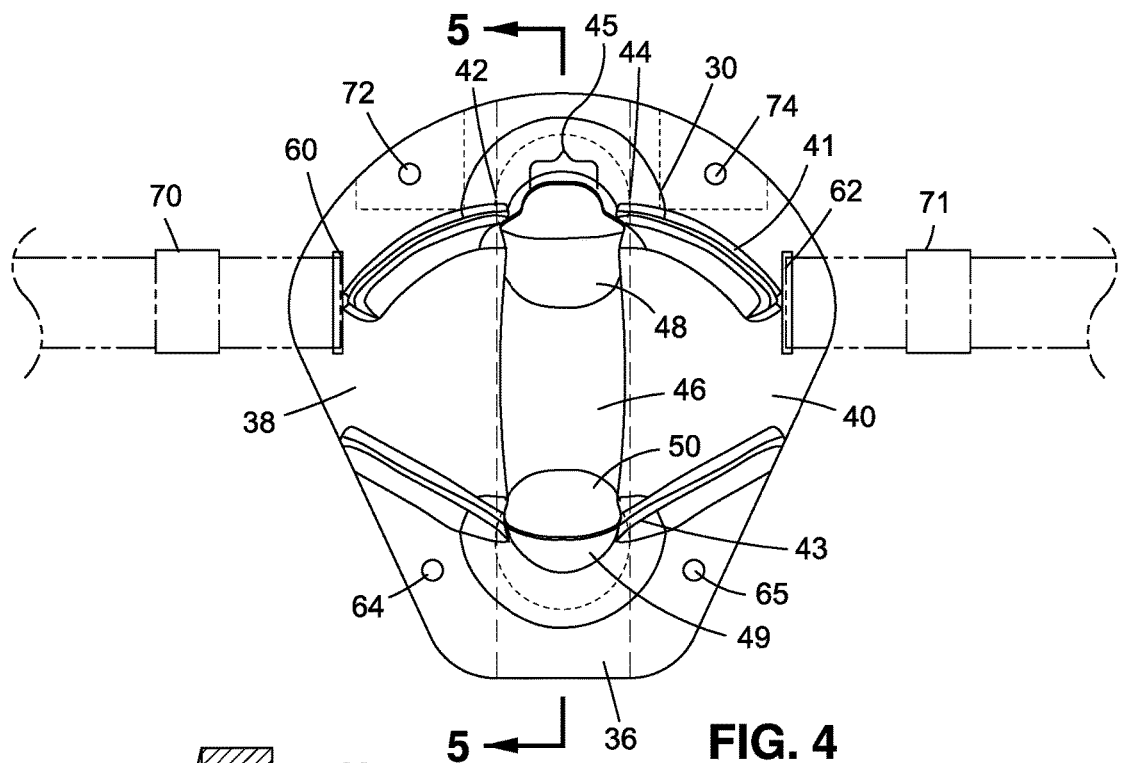
FIG. 4 is a front view of the primary panel shown with the back brace attached.

As best illustrated in FIG. 4, the fishing rod harness 12 includes a primary panel 30 that can receive the fishing rod 16. The primary panel 30 is generally defined by an external side 32 that faces away from the abdomen 28, and an opposed internal side 34 that is positioned against the abdomen 28. In this regard, the opposed internal side 34 can have a contour that substantially conforms to the abdomen 28.

In accordance with one embodiment, the primary panel 30 is characterized by a central section 36, a left peripheral section 38 and a right peripheral section 40. As best illustrated in FIG. 4, the central section 36 is interposed between the left peripheral section 38 and the right peripheral section 40. Further, the central section 36 extends between a top ridge 41 and a bottom ridge 43. The top and bottom ridges 41, 43 guide the angler 10 in finding the upper and lower rod receptacles without interruption and having to look down on the primary panel 30 when fighting a hooked fish. Once the top ridge 41 or the bottom ridge 43 is located, the angler 10 may then guide the fishing rod 16 to the corresponding receptacles. Generally, the central section 36 is separated from the left peripheral section 38 along a first bend axis 42, and from the right peripheral section 40 along a second bend axis 44. With the central section 36 extending substantially parallel to the torso 14, the left peripheral section 38 and the right peripheral section 40 are understood to be angled slightly therefrom. The first bend axis 42 and the second bend axis 44 are shown by way of example only, and the particular contour and bend between the central section 36 and the respective one of the left and right peripheral sections 38, 40 may be varied to achieve different appearances, accommodate different body shapes and size, and so forth Based upon the size of the average angler 10, the primary panel 30 may have approximate dimensions of 14 inches by 11 inches. It will be appreciated, however, that the primary panel 30 may have any set of dimensions to accommodate various body sizes, while being sized to support the weight of the fishing rod 16 as well as any forces exerted by the fighting fish. One embodiment contemplates the primary panel 30 having a unitary construction, though for portability, it may be constructed in multiple sections that may be subsequently expanded for deployment. The fishing rod harness 12 is intended to be worn for extended periods of time in marine environments, which are typically corrosive due to salt water and involve substantial temperature swings. Further, equipment used in connection with fishing, and any outdoor activity for that matter, is typically subject to rough handling and abuse. Therefore, the primary panel 30 may be constructed of any lightweight, resilient, and waterproof material such as plastic, acrylic, and the like. Thus, the primary panel 30 may be constructed by any plastics manufacturer, utilizing a template that stamps out the outline thereof along with several openings as will be described in greater detail below. Once such a flat sheet is produced, it may be heated and bent to produce the aforementioned contours. For custom fitment, the step of bending the contours of the primary panel 30 may be performed for each individual angler 10. Decorative enhancements may also be affixed to the surface of the primary panel 30. Several of the techniques involved in the foregoing process are well known in the art, and those having ordinary skill will be able to readily ascertain such techniques.

The central section 36 defines an open partially cylindrical groove 46, an upper partially spherical socket 47 with an open end 48, and a lower partially spherical socket 49 with an open end 50. The groove 46 extends between the upper socket open end 48 and the lower socket open end 50. The upper socket 47 and the lower socket 49 are receptive to a partially spherical joint member, which may be a socket ball 51 attachable to the fishing rod 16 at the fishing rod butt 24. The upper and lower sockets 47, 49 are accordingly sized and shaped to define a mating relationship thereto. The upper and lower sockets 47, 49 and the socket ball 51 are understood to effectively define a ball-and-socket joint, and can be freely rotated along the x-axis and the y-axis, e.g., in rotating engagement.

Figure 8:
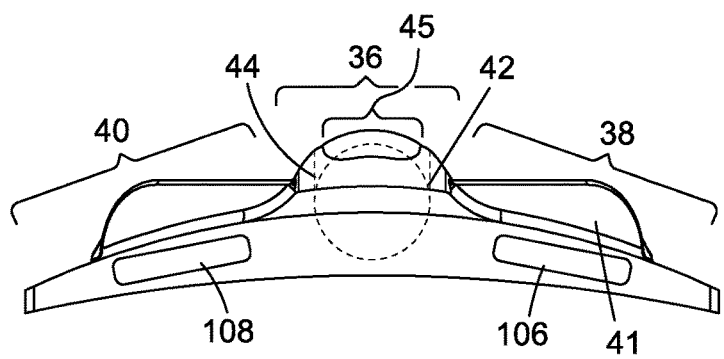
FIG. 8 is a top view of the primary panel.

As best illustrated in FIGS. 4 and 8, the top ridge 41 may break into a notch 45 between the first bend axis 42 and second bend axis 44 to allow for the fishing rod 16 to have more freedom to move up on the y-axis when the rod is coupled with the upper socket 47. Hence, the angler may pull up the fishing rod 16 coupled with the upper socket 47 to a higher degree (e.g., 45 degrees or 90 degrees) to the horizontal axis 19 in order to apply pressure on the fish as needed in efforts to bring the fish closer to the rail 29 and reel it in.

The socket ball 51 has an open end 80 through which the butt 24 of the fishing rod 16 is inserted. An interior cylindrical slot 82 is further defined within the socket ball 51 that retains the fishing rod 16. In this regard, the socket ball 51, or at least the portion thereof that engages with the fishing rod 16, may be constructed of a resilient yet flexible material such as rubber, with the cylindrical slot 82 and the open end 80 being slightly undersized for frictional retention of the fishing rod 16.

Figure 5:
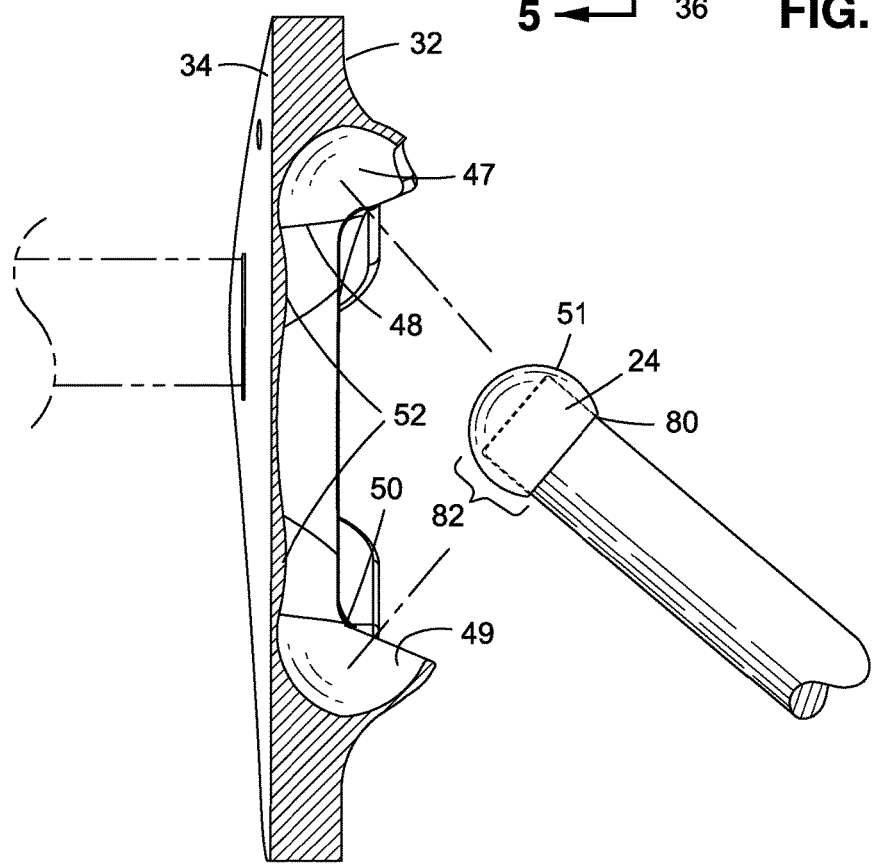
FIG. 5 is a cross-sectional view of the primary panel shown with the back brace attached and an attachable fishing rod butt coupled with a socket ball.
Figure 6:
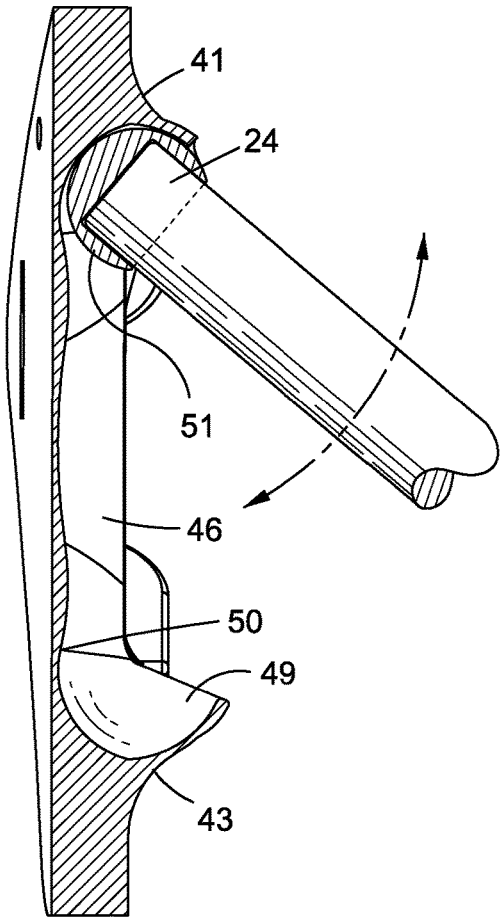
FIG. 6 is a cross-sectional view of the primary panel shown with the fishing rod attached to the upper socket of the primary panel.
Figure 7:
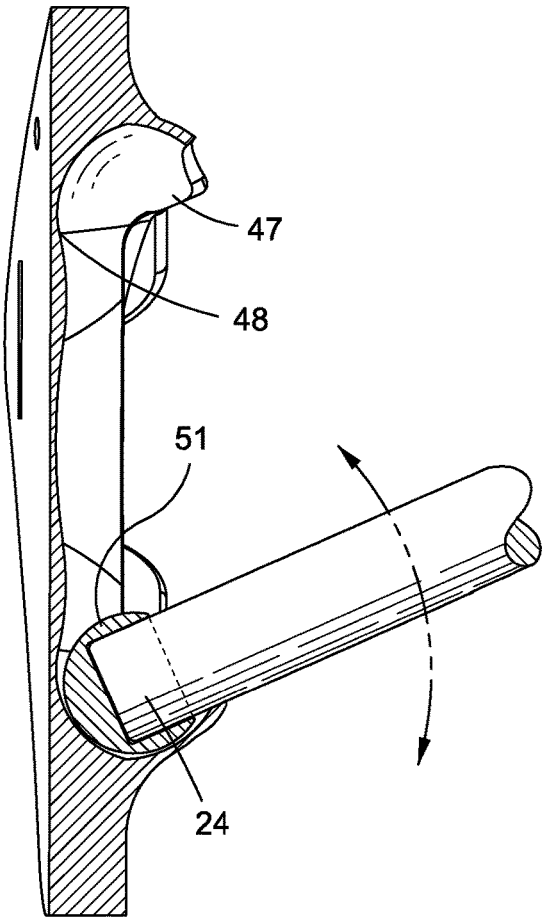
FIG. 7 is a cross-sectional view of the primary panel shown with the fishing rod attached to the lower socket of the primary panel.

The socket ball 51 is slidably engageable with the groove 46. FIG. 5 shows the depth difference between the upper socket 47 and the upper socket 47 open end 48, as well as the depth difference between the lower socket 49 and the lower socket 49 open end 50, respectively. Curved wedges 52 are created by these depth differences. These curved wedges 52 structurally support the socket ball 51 and allow the upper socket open end 48 and the lower socket open end 50 to contain the socket ball 51 within the upper socket 47 and the lower socket 49, respectively. The orientation of the lower socket open end 50 is offset upwards and the orientation of the upper socket open end 48 is offset downwards from perpendicular to the surface of the primary panel 30 so that the fishing rod 16, in its typical slightly upward orientation, and, when resting on the boat rail, in its typical slightly downward orientation, can be readily coupled to the lower socket 49 and upper socket 47 without much disturbance of the line tension already established after casting out, respectively.

As illustrated in FIG. 2, in one embodiment, the angler 10 may couple the socket ball 51 attached to the fishing rod 16 with the upper socket 47 and rest the fishing rod on a boat rail 29. If the angler 10 decides to switch to stand-up fishing, as illustrated in FIG. 1, the angler 10 may pull out the socket ball 51 from the upper socket 47 enough to clear the wedges 52, move the socket ball 51 into the groove 46 through the upper socket open end 48, and slide the socket ball 51 down the groove 46 to couple the socket ball 51 with the lower socket 49 through the lower socket open end 50. In this position, the angler 10 may hold the fishing rod 16 at upward angle to the horizontal axis 19 and off the rail 29.

As indicated above, the upper socket 47 and the lower socket 49 are for holding the fishing rod 16 in a comfortable position. The upper socket 47 and the lower socket 49 are partially spherical in shape. It is understood that the partially spherical shape allows the fishing rod 16 to be rotated with ease. Furthermore, instead of having an upper socket 47, a lower socket 49, and a groove 46 that extend into the primary panel 30, there may be protrusions that extend outwards from the same. Again, the foregoing configurations are only exemplary, and equivalent alternatives are deemed to be within the scope of the present disclosure.

Referring again to FIG. 1, the fishing rod harness 12 of the present disclosure is also contemplated to include at least one harness member 54 cooperating with the primary panel 30 to secure the same to the torso 14, and to redirect horizontal forces against the primary panel to a vertical direction. In this regard, as the fishing rod 16 exerts forces upon the primary panel 30 in the manner discussed above, i.e., the forces in the direction of the x-axis 18 and the direction of the y-axis 20, such forces are transferred to the primary panel 30 via either the upper socket 47 or the lower socket 49. This force or pressure is then redirected to a vertical axis 19 against the left shoulder 90 and the right shoulder 92 of the angler 10 through the torso 14 and to the feet via the harness member 54. This configuration is also understood to distribute such forces evenly across the torso 14 while avoiding pressure points. Accordingly, the leaning back and bending over body actions described above as being problematic is lessened because the fishing rod 16 is closer to a vertical orientation, and decreases the load on the upper and lower back of the angler 10.

Figure 3C:
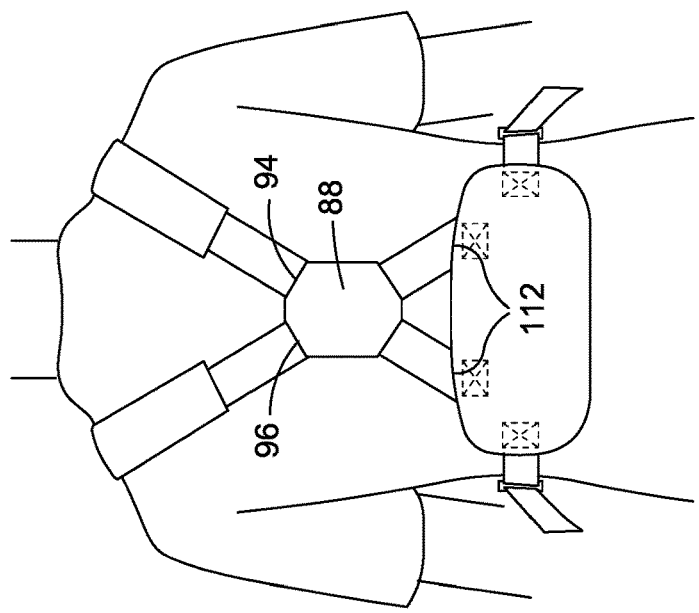
FIG. 3C is a rear view of the fishing rod harness being worn on the torso.
Figure 3B:
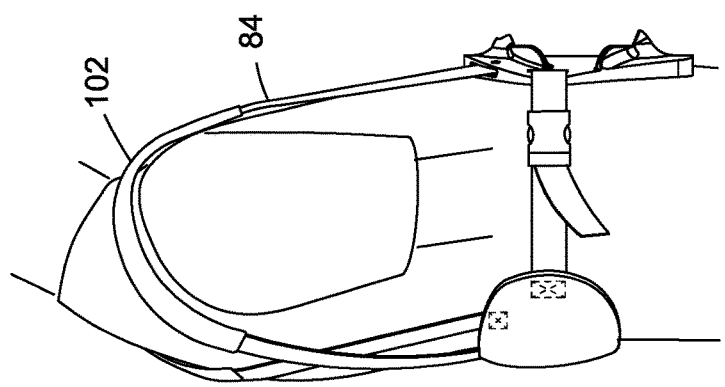
FIG. 3B is a side view of the fishing rod harness being worn on the torso.
Figure 3A:
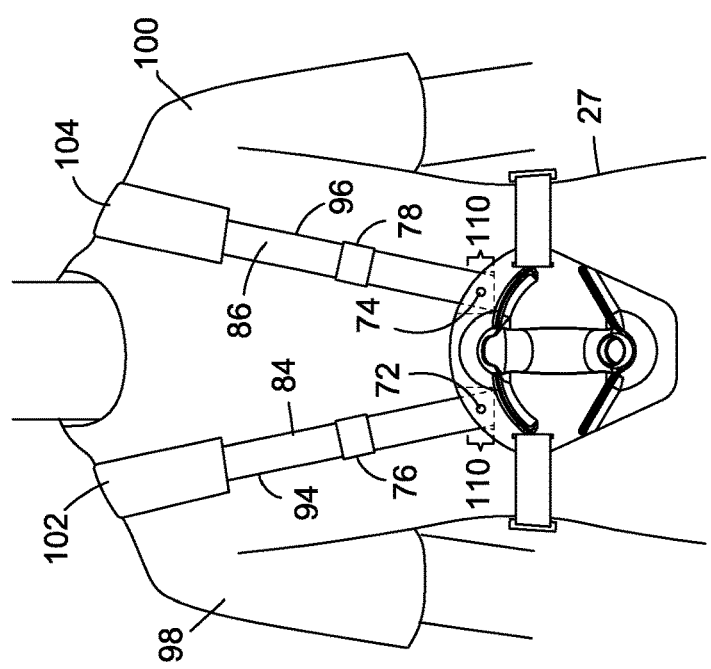
FIG. 3A is a front view of the fishing rod harness being worn on the torso.

As best illustrated in FIGS. 3A-C, one embodiment of the harness member 54 may be engageable with the left shoulder 90, as well as the right shoulder 92 of the angler 10. In further detail, the harness member 54 may be defined by a first suspender member 84 that goes over the left shoulder 90 and may fasten to the waist 27 of the angler 10 via attachment locations such as pants, a utility belt, or a back brace 58. The first suspender member 84, together with the primary panel 30 and the attachment at the waist 27 may define a loop through which the left arm 98 is inserted. The harness member 54 may also be defined by a second suspender member 86 that goes over the right shoulder 92 and may also fasten to the waist 27 of the angler 10 via pants, utility belt, or a back brace 58 (as shown in FIG. 3C). Likewise, the second suspender member 86, together with the primary panel 30 and the attachment at the waist 27 may define a loop through which the right arm 100 is inserted. The left peripheral section 38 of the primary panel 30 may define an upper hole 72, to which the first suspender member 84 may be attached. A first buckle 76 or clasp may adjustably retain the first suspender member 84. Relatedly, the right peripheral section 40 of the primary panel 30 may define a second upper hole 74, to which the second suspender member 86 may be attached, with a second buckle 78 or clasp that may adjustably retain the second suspender member 86. Although a slip lock buckle may be utilized for the first buckle 76 and the second buckle 78, any other adjustable retention modality known in the art may be readily substituted.

Further referring to FIGS. 3A-C, the first and second suspender members 84, 86 may be two individual strips of fabric or webbing material of sufficient length for one to extend from the upper left hole 72 to extend over the left shoulder 90 and reach the waist 27 of the angler 10 for attachment and the other to extend from the upper right hole 74 to also extend over the right shoulder 92 and reach the waist 27 of the angler 10 for attachment in the manner described above. The first and second suspender members 84, 86 may be flat and approximately one inch in diameter. Any suitable material having resiliency and flexibility may be utilized therefor, including nylon, Dacron® Lycra®, and so forth. The first and second suspender members 84, 86 may attach to the upper left hole 72 and the upper right hole 74 by being inserted into the panel 30 from the first ends 110 of the suspender members 84, 86 respectively via hooks, pins, latches, buckles, dowels or any other suitable fastening mechanism known in the art. The fastening may be facilitated by inserting the first ends 110 of the suspender members 84, 86 into a left slot 106 and a right slot 108 positioned behind the upper left and right holes 72, 74, respectively, and engaging the first ends 110 with the upper left and right holes 72, 74 via hooks, pins, latches, or dowels. The slots 106, 108 may extend from the top end of the panel 30 inwards between the external and internal sides 32, 34.

At the waist 27, the second ends 112 of the suspender members 84, 86 may attach to the pants, utility belt, back brace 58 (as shown in FIG. 3C) or any other suitable site at the waist 27 or generally on the back 26 of the angler 10 via hooks, clips, pins, clamps or any other suitable fastening mechanism known in the art. Depending on the way in which the first and second suspender members 84, 86 go over the left shoulder 90 and the right shoulder 92, respectively, as well as fasten to the waist 27, the first suspender member 84 and the second suspender member 86 may not be contiguous. It will therefore be appreciated that the first suspender member 84 and the second suspender member 86 are referenced in the most general sense as the components that define the loop through which a respective one of the left and right arms 98, 100 are to be positioned. Notwithstanding the express disclosure of the harness member 54 comprised of the first and second suspender members 84, 86, other variations thereof are also envisioned to be within the scope of the present disclosure.

As best illustrated in FIG. 3C, the harness member 54 may further include a back cross clasp 88 which interconnects the first suspender member 84 and the second suspender member 86. In further detail, the first and second suspender members 84, 86 may respectively extend from the left and right peripheral sections 38, 40 of the primary panel 30, go over the shoulders 90, 92 and may be attached together at the back 26 via the back cross clasp 88. At the back 26, the first suspender member 84 may extend diagonally across a first clasp slot 94 to attach to the back brace 58, and the second suspender member 86 may extend diagonally across a second clasp slot 96 to attach to the back brace 58. The suspender members 84, 86 may attach to the back brace 58 from their second ends 112 via hooks, clips, pins, clamps or any other suitable fastening mechanism known in the art. Alternately, the suspender members 84, 86 may be sown to the back brace 58 at their seconds ends 112 and extend therefrom to the panel 30. Alternately, the back cross clasp 88 may guide the suspender members 84, 86 over the back, with or without the back brace 58 attached to the waist 27, where the second ends 112 may attach to the pants of the angler 10 as mentioned above.

As noted above, the overall working lengths of the suspender members 84, 86 are adjustable to fit the torso 14 of the angler 10 by manipulating the first buckle 76 and the second buckle 78, respectively. The lengths of the suspender members 84, 86 are adjusted accommodate anglers of varying heights and girth, and for comfort. It is understood that the length of slack from the first buckle 76 and the second buckle 78 are substantially the same, and other adjustments may be made in relation to the back cross clasp 88. Along these lines, the suspender members 84, 86 have sufficient length to be configured in the manner described above. With the above-described harness member 54, it is understood that the fishing rod harness 12 is readily removable and attachable to and from the torso 14, thereby facilitating movement about the fishing platform. Adjustments are likewise quick to make, and the fishing rod 16, as mentioned previously, can be raised and lowered without much exertion by the angler 10.

With reference to FIGS. 3A-C, in one configuration, the fishing rod harness 12 may include a left shoulder pad 102 and a right shoulder pad 104 that is mounted to the first and second suspender members 84, 86 at the point where there is contact with the left shoulder 90 and the right shoulder 92, respectively. The shoulder pads 102, 104 may be particularly suitable for long and strenuous fishing sessions involving heavier fish and tackle, or if some degree of sun protection of the shoulders is desired.

In addition to the suspender members 84, 86, the harness member 54, may include a back brace 58 that extends from the primary panel 30. As illustrated in FIG. 1, the back brace 58 cooperates with the primary panel 30 to secure the torso 14, and to redirect horizontal forces against the primary panel to a vertical direction 21. In this regard, as the fishing rod 16 exerts forces upon the primary panel 30 in the manner discussed above, i.e., the forces in the direction of the x-axis 18 and the direction of the y-axis 20, such forces are transferred to the primary panel 30 via either upper socket 47 or lower socket 49. This force or pressure is then redirected to a vertical direction 21 through the torso 14 and to the feet via the back brace 58. This configuration is also understood to stabilize the back 26 by applying pressure to the abdomen 28. Accordingly, the leaning back and bending over body actions described above as being problematic is lessened because the fishing rod 16 is closer to a vertical orientation 21, and the load is decreased on the upper and lower back of the angler 10.

As best illustrated in FIGS. 3A-C, the back brace 58 is engageable with the torso 14 of the angler 10. More particularly, the back brace 58 loops around the torso 14. The region of the torso where the back brace 58 loops may encompass the abdomen 28. The left peripheral section 38 of the primary panel 30 defines a left slit 60, through which the back brace 58 is threaded. Relatedly, the right peripheral section 40 of the primary panel 30 defines a right slit 62, also through which the back brace 58 is threaded. In one embodiment, a left buckle 70 or clasp and a right buckle or clasp 71 adjustably retain the back brace 58. Although a slip lock buckle may be utilized for the left buckle 70 and the second buckle 71, any other adjustable retention modality known in the art may be readily substituted.

In one embodiment of the fishing rod harness 12, the back brace 58 may be a single, continuous strip of fabric or webbing material of sufficient length to loop around the torso 14 in the manner described above. This single strip may be flat and approximately between 1 inch to 5 inches in width. Any suitable material having resiliency and flexibility may be utilized therefor, including nylon, Dacron®, Lycra®, and so forth. Notwithstanding the express disclosure of the back brace 58, other variations thereof are also envisioned to be within the scope of the present disclosure.

As noted above, the overall working length of the back brace 58 is adjustable to fit the torso 14 of the angler 10 by manipulating the left buckle 70 and the right buckle 71. The length of the back brace 58 is adjusted to accommodate anglers 10 of varying girth and for comfort. It is understood that the length of slack from the left buckle 70 and the right buckle 71 are substantially the same. Along these lines, the back brace 58 has sufficient length to be configured in the manner described above. With the above-described back brace 58, it is understood that the fishing rod harness 12 is readily removable and attachable to and from the torso 14, thereby facilitating movement about the fishing platform. Adjustments are likewise quick to make, and the fishing rod 16, as mentioned previously, can be raised and lowered without much exertion by the angler 10.

Referring back to FIG. 2, the fishing rod harness 12 may include a butt seat 56, which cooperates with the primary panel 30 via straps 59 extending from the butt seat 56 and attaches to the left and right peripheral sections 38, 40. This may push up the angler 10 from the buttocks of the angler 10. The butt seat 56 may be used when the angler 10 squats down to adjust the torso 14 with respect to the boat rail 29 during rail fishing to leverage the boat rail 29. When the angler squats down on the butt seat 56, the straps 59 connecting the butt seat 56 to the primary panel 30 apply a downward pulling force on the primary panel 30 due to the force applied on the seat 56 by the weight of the angler 10, and the same force pulls down on the fishing rod butt 24. This configuration allows the angler 10 to lean on the rod butt 24 with greater ease when using the fishing rod 16 as a level and the rail 29 as a fulcrum to maximize the pressure put on the fish, thereby slowing down the fish.

In further detail, this embodiment includes a butt seat 56 attached to the primary panel 30 with straps 59. More particularly, the straps 59 loop around the torso 14 and the buttocks of the angler 10. The region of the torso where the back brace 58 loops may encompass the pelvis and the abdomen 28. The left peripheral section 38 of the primary panel 30 defines a lower left hole 64 and the right peripheral section 40 of the primary panel 30 defines a lower right hole 65, to both of which the straps 59 are attached. The length of the straps 59 may be adjusted to accommodate anglers of varying height, girth, and for comfort. Buckles or clasps may be used to adjustably retain the straps 59. Although a slip lock buckle may be utilized for the strap 59 buckles, any other adjustable retention modality known in the art may be readily substituted.

In one embodiment, the butt seat 56 may be rigid. Plastic, wood, or light metals such as aluminum may be used to make the butt seat 56. The material may further be molded to have the butt seat 56 have a seating surface 57 that complements the physiological shape of the buttocks for comfort. The butt seat 56 may be approximately 15 inches wide and 8 inches long. The seating surface 57 may have a left side 67 and a right side 68. The straps 59 may be attached to the rigid butt seat 56 through a lower left hole 64 on the left side 67 and a lower right hole 65 on the right side 68. The straps 59 may be two pieces to separately hook the butt seat 56 from the left peripheral section 38 and the right peripheral section 40 to the butt seat 56. Both ends of each strap 59 may have hooks 66 to facilitate the attachment to the lower left hole 64 and the attachment to the lower right hole 65. However, other suitable fastening methods known in the art may replace the hooks 66.

In another embodiment, the butt seat 56 may be soft. Any suitable material having resiliency and flexibility may be utilized therefor, including the aforementioned. The thickness of the butt seat 56 may be approximately 8 inches. The soft butt seat 56 may extend to the lower left hole 64 and lower right hole 65 of the primary panel and its ends may have hooks 66 that attach to the lower left and right holes 64, 65 to form a loop around the buttocks.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An apparatus wearable on a body of a user to support an article engageable with a partially spherical joint member, the apparatus comprising:
    a primary panel defined by a top end, a bottom end, and a center axis spanning between the top and bottom ends, the primary panel integrally defining an upper partially spherical socket having an open end and a lower partially spherical socket having an open end both aligned along the center axis, the primary panel further integrally defining an open partially cylindrical groove extending from the open end of the upper partially spherical socket to the open end of the lower partially spherical socket and being configured to be engageable with the partially spherical joint member, the upper partially spherical socket and the lower partially spherical socket each being configured to be rotatably engageable with the partially spherical joint member; and at least one harness member cooperating with the primary panel to secure the primary panel to the body.

2. The apparatus of claim 1, wherein the primary panel is further defined by an external side and an internal side having a contour substantially conforming to an abdominal side of the body of the user.

3. The apparatus of claim 1, wherein the primary panel has a unitary construction of plastic.

4. The apparatus of claim 1, wherein the primary panel is further defined by a central section interposed between a left peripheral section and a right peripheral section, the central section being defined by a top and a bottom.

5. The apparatus of claim 4, wherein the top and the bottom of the central section are defined by a top ridge housing the upper socket and a bottom ridge housing the lower socket.

6. The apparatus of claim 4, wherein the left peripheral section and the right peripheral section each further define at least one slit.

7. The apparatus of claim 4, wherein the harness member is a back brace engageable with the left peripheral section and the right peripheral section of the primary panel to define a loop in which the body of the user is buckled.

8. The apparatus of claim 7, wherein the back brace is engageable with at least one of the slits in the respective one of the left peripheral section and the right peripheral section.

9. The apparatus of claim 7, wherein the back brace is a single, continuous fabric strip.

10. The apparatus of claim 1, wherein the left peripheral section and the right peripheral section of the primary panel each define at least one hole.

11. The apparatus of claim 10, wherein the harness member is a seat engageable with the left peripheral section and the right peripheral section of the primary panel to define a loop around which a set of buttocks of the user is inserted.

12. The apparatus of claim 11, wherein the seat is engageable with at least one of the holes in the respective one of the left peripheral section and the right peripheral section.

13. The apparatus of claim 1, wherein the left peripheral section and the right peripheral section of the primary panel each define at least one upper hole.

14. The apparatus of claim 13, wherein the primary panel defines at least one partially hollow space extending from the top end behind at least one of the holes.

15. The apparatus of claim 13, wherein the harness member is suspenders engageable with the left peripheral section and the right peripheral section of the primary panel to define a loop around which a left arm is inserted and a loop around which a right arm is inserted.

16. The apparatus of claim 1, wherein the article is a fishing rod.

17. An apparatus wearable on a body of a user to support a fishing rod, the apparatus comprising:

a partial spherical joint member configured to be engageable with the fishing rod;

a primary panel defined by a top end, a bottom end, and a center axis spanning between the top and bottom ends, the primary panel integrally defining, an upper partially spherical socket having an open end and a lower partially spherical socket having an open end both aligned along the center axis, an edge of the open end of the upper partially spherical socket defining a notch, the primary panel further integrally defining an open partially cylindrical groove extending from the open end of the upper partially spherical socket to the open end of the lower partially spherical socket, the upper partially spherical socket and the lower partially spherical socket each being receptive to the partial spherical joint member in a rotating engagement, the partial spherical joint member being engageable with the partially cylindrical groove; and at least one harness member cooperating with the primary panel to secure the primary panel to the body.

18. The apparatus of claim 17, wherein the partially spherical joint member is a socket ball.

19. The apparatus of claim 18, wherein the partially spherical joint member is further slidably engageable with the open channel.

20. An apparatus wearable on a body of a user to support a fishing rod having a partially spherical joint member connected thereto, the apparatus comprising:

a primary panel defined by a top end, a bottom end, and a center axis spanning between the top and bottom ends, the primary panel integrally defining an upper partially spherical socket having an open end and a lower partially spherical socket having an open end both aligned along the center axis, an edge of the open end of the upper partially spherical socket defining a notch, the primary panel further integrally defining an open partially cylindrical groove extending from the open end of the upper partially spherical socket to the open end of the lower partially spherical socket and each being configured to be engageable with the partial spherical joint member, the upper partially spherical socket and the lower partially spherical socket being configured to be selectively rotatably engageable with the partial spherical joint member; and at least one harness member cooperating with the primary panel to secure the primary panel to the body.

* * * * *